Dec. 20, 1966  J. A. McCANN  3,292,426

VIBRATION DETECTION DEVICE

Filed July 26, 1963

INVENTOR.

JOSEPH A. McCANN

United States Patent Office 3,292,426
Patented Dec. 20, 1966

3,292,426
VIBRATION DETECTION DEVICE
Joseph A. McCann, Scotia, N.Y., assignor to the United States of America as represented by the United States Atomic Energy Commission
Filed July 26, 1963, Ser. No. 297,992
4 Claims. (Cl. 73—71.4)

The invention described herein was made in the course of, or under, a contract with the U.S. Atomic Energy Commission.

This invention relates to a new and improved vibration detection device. Particularly, the subject invention relates to a vibration detector which is capable of measuring the vibrations and motion of some form of a mechanical member contained in some form of structure such as a nuclear power reactor control rod enclosed in a control rod test cell.

It would be desirable to detect and analyze the vibration of a control rod in a nuclear power reactor in order to prevent damage to the control rod, its encapsulating structure and the surrounding fuel elements should such vibration tend to become excessive. A test cell simulating actual operation flow conditions in a reactor is utilized since the control rod is inaccessible in the reactor itself. Such detectors must be able to sense these vibrations through the test cell structure enclosing the control rod so as not to disturb or disrupt the flow of coolant fluid around the control rods. Furthermore, the detectors must be directionally exclusive (i.e., capable of measuring vibrations in any given direction exclusive of another direction) and capable of measuring vibrations in any and all directions at the same time so as to provide a complete analysis and record of the vibrations. Still further, the detector should provide a signal which can be easily analyzed by standard electrical equipment giving an indication of the direction, frequency and magnitude of vibrations.

In view of the above, it is an object of this invention to provide a directionally exclusive vibration detector which can measure a mechanical member's vibration in any given direction.

Further, it is an object of this invention to provide a vibration detector which can measure the vibrations of a mechanical member enclosed within some form of housing or structure and subject to kinetic hydro-dynamic forces.

It is still a further object of the present invention to provide a vibration measuring device which will measure the magnitude, frequency and direction of vibration of a mechanical member.

A preferred embodiment of this invention comprises a set of pickup coils arranged in accordance with the direction of vibration to be measured. A permanent magnet is attached to the mechanical member being monitored. The pickup coils are positioned opposite the magnet. When the member vibrates the magnetic field induces an electrical signal in the pickup coils representative of the vibrations. This signal is then analyzed and recorded.

Various other objects and advantages will appear from the following description of several embodiments of the invention and the most novel features will be particularly pointed out hereinafter in connection with the appended claims. The invention and the several features thereof will be understood more clearly and fully with reference to the accompanying drawing, in which:

Figure 1:
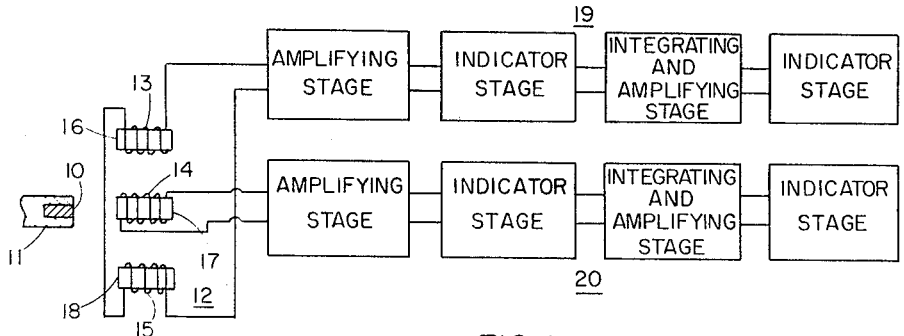
FIGURE 1 is a schematic view and block diagram of a preferred embodiment of this invention.

Referring to FIGURE 1, which illustrates schematically a preferred embodiment of this invention, a permanent magnet 10 is attached to a mechanical member 11, the vibration of which is to be analyzed and which forms no part of this invention, providing a static magnetic field around member 11 opposite vibration detector 12. Secondary coils 13 and 15, wound around cores 16 and 18 respectively, are connected in series so that the current flowing in one will be 180 degrees out of phase with the current flowing in the other. Coils 13 and 15 are then connected to utilization circuit 19. Secondary coil 14 wound around core 17, is connected to utilization circuit 20. Core 17 is placed in axial alignment with magnet 10. Cores 16 and 18 are placed on either side of core 17 parallel to the magnetic axis of magnet 10 and along the axis of the motion to be detected.

In the operation of the particular embodiment shown any vibration or motion of member 11 induces an electromotive force in coils 13, 14 and 15 that is proportional to the frequency and amplitude of vibration of member 11. Since coils 13 and 15 are connected in electrical opposition, the voltage induced in these coils by vibrations in any direction other than that perpendicular to the magnetic axis of magnet 10, and in the plane of FIGURE 1, will be cancelled out at the input to utilization circuit 19.

At the same time, due to the alignment of coil 14 with magnet 10, the voltage induced in coil 14 will be primarily caused by vibrations along the magnetic axis of magnet 10. When the vibration of member 11 is in a direction perpendicular to the magnetic axis of magnet 10 and in the plane of FIGURE 1, the voltage induced in coils 13 and 15 will be additive, sending a signal to utilization circuit 19 twice as large as that of the voltage induced in an individual coil. In this manner, the directional sensitivity of vibrations is achieved.

It will be understood that the embodiment of the invention illustrated in FIGURE 1 can be modified by placing further pairs of coils similar to coils 13 and 15 around coil 14 in planes passing through the magnetic axis of magnet 10, so as to measure motion or vibration in that plane. The vibration detector can, therefore, be modified to measure motion or vibrations in any direction around the magnetic axis of magnet 10, without affecting or changing any other pickup coil in the detector.

The circuit arrangement employed by the present invention to analyze the electrical signals induced in vibration detector 12 is shown by the block diagrams of utilization circuits 19 and 20. In these identical circuits the electronic components comprise an amplifying stage, a first indicator stage, an integrating and amplifying stage and a second indicator stage. Either of the indicator stages of either circuit can be a standard galvanometer oscillograph. The integration can be performed by any standard RC network. It will be apparent that additional instruments such as an oscilloscope may readily be employed in accordance with the test data desired.

As shown in FIGURE 1, the first indicator stage of both utilization circuits 19 and 20 will, depending upon the particular instrument used, measure and record or display a voltage that is proportional to the rate of change of magnetic flux or in other words, the velocity of motion of the magnet. The second indicator stage of both utilization circuits 19 and 20 will measure the time integral of the velocity trace which is equal to the instantaneous relative rod displacement for that velocity channel, subject to some constant of integration. By calibrating the apparatus while running tests, under different operating conditions, the magnitude and frequency of vibration of member 11 can be readily determined with accuracy.

Figures 2, 3:
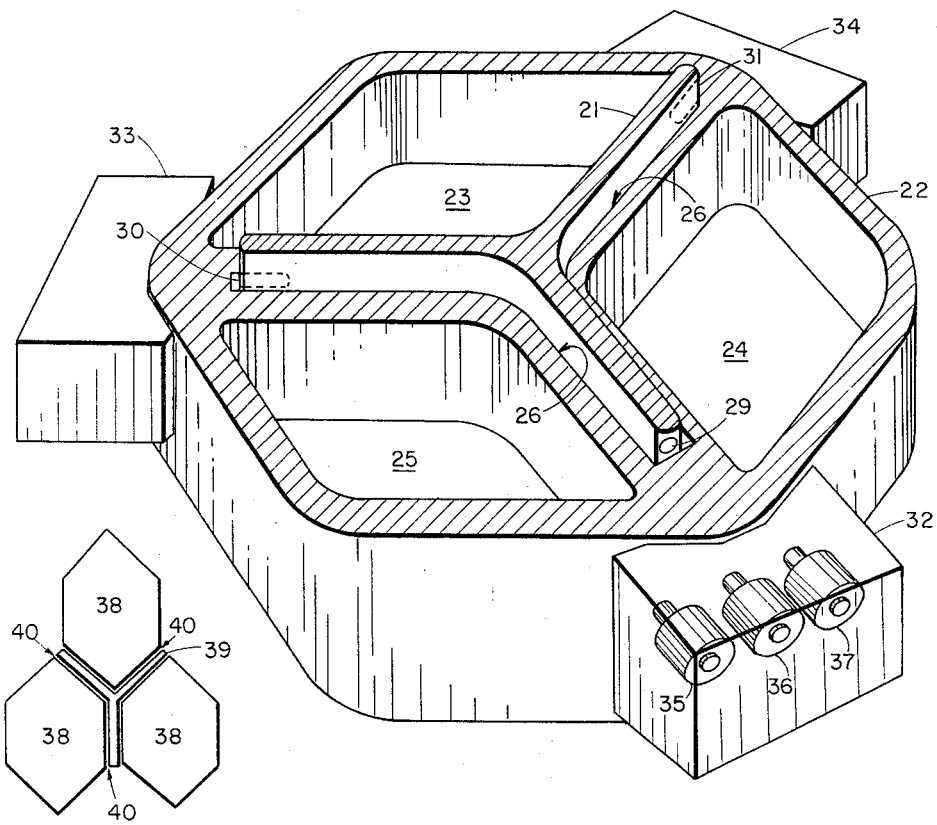
FIGURE 2 is a schematic view of a portion of a hexagonal reactor core configuration including the fuel modules and control rod.
FIGURE 3 is a cut away view of a portion of a control rod test cell simulating the core configuration of FIGURE 2 including an embodiment of this invention.

FIGURE 2 illustrates a portion of a hexagonal reactor core configuration. The core comprises a grouping of hexagonal fuel modules 38 interspersed with Y-shaped control rods 39. The coolant flows through passages (not shown) in the modules 38 and between the modules 38 and the control rods 39 through passage 40.

Referring to FIGURE 3 of the drawings, a cutaway of a portion of a control rod test cell is shown which simulates the reactor core configuration of FIGURE 2. The test cell utilizes this invention for determining the frequency and magnitude of vibration of a three bladed control rod in its coolant flow channel. Control rod 21 is raised and lowered in the test cell through tube structure 22. Within tube structure 22 there are three coolant flow passages 23, 24, and 25 sourrounding a three bladed control rod channel 26. With control rod 21 inserted in tube structure 22, a coolant flows around control rod 21 on all sides through channel 26. Channel 26 represents the passage 40 between the fuel element modules of FIGURE 2. Permanent magnets 29, 30 and 31 are each imbedded in a different blade of control rod 21. Vibration detectors 32, 33 and 34 are attached to tube structure 22 opposite magnets 29, 30 and 31 respectively. Vibration detector 32, which is identical in structure and operation to vibration detectors 33 and 34, has three coils, 35, 36 and 37 connected in the same manner as vibration detector 12 in FIGURE 1.

As a coolant fluid flows through channel 26, vibrations are generated in the blades of the control rod 21 which are then sensed by vibration detectors 32, 33 and 34. All motion or vibration along the magnetic axis of magnets 29, 30 and 31 will be sensed by the center coil in each detector such as coil 36 in detector 32. Any horizontal motion or vibration will be sensed by the outer coils such as coils 35 and 37 in detector 32. By this means a complete picture of the vibration of control rod 21 can be determined by combining the data obtained from all three blades.

This invention is not limited to usage with the illustrated core configuration but can be modified within the scope of the invention to measure vibrations of any control rod shape in a test cell simulating any core configuration. The principles of this invention can be utilized in any problem where the motion of some mechanical member need be sensed and measured. In particular, the vibration detector of this invention can be used to sense and measure this motion without disrupting the operation of the mechanical member since the pickup coils can be placed at a greater distance from the mechanical member than has been commonly achieved in the prior art, even in the case where there is some structure between the member being monitored and the detector. For example, this invention has been employed to measure a 0.001 inch one cycle per second vibration with a magnet to pickup spacing of greater than one inch. Further, the detector with this invention can be utilized to measure motion or vibration in any direction exclusive of vibration in any other direction, thereby enabling a complete vector analysis of all vibratory motion.

It will be understood that various changes in the details, materials, steps and arrangements of the parts which have been herein described and illustrated in order to explain the nature of the invention may be made by those skilled in the art within the principles and the scope of the invention as expressed in the appended claims.

I claim:
1. An apparatus for measuring vibrations of a mechanical member comprising:
   (a) magnetic means attached to said mechanical member for providing a magnetic field static with respect to said member;
   (b) a plurality of coils including at least one pair of coils opposite said magnetic means, the coils of said coil pair on opposite sides of the magnetic axis of said magnetic means in a plane passing through said magnetic axis, whereby each of said plurality of coils senses any movement of said magnetic field and generates an electrical signal representative of said movement;
   (c) means for connecting the coils of said coil pair in electrical opposition so that the electrical signals generated in each coil of said coil pair in response to movement of said magnetic means in any direction other than from translational movement at right angles to the magnetic axis of said magnetic means and in said coil pair plane are canceled; and
   (d) circuit means connected to said coils and coil pair for analyzing the resulting signal to determine the frequency and magnitude of movement of said member including translational movement in said coil pair plane.

2. The vibration measuring device of claim 1 having a plurality of coil pairs, each of said coil pairs connected in electrical opposition and to said circuit means and having each coil pair in a different plane passing through the magnetic axis of said magnetic means with the coils of each coil pair on opposite sides of said magnetic axis whereby said circuit means determines the frequency and magnitude of movement of said member including translational movement in each of said planes.

3. The vibration measuring device of claim 1 wherein said magnetic means is a permanent magnet.

4. An apparatus for measuring vibrations of a mechanical member comprising:
   (a) magnetic means attached to said mechanical member for providing a magnetic field static with respect to said member;
   (b) a pair of coils opposite said magnetic means in a plane passing through the magnetic axis of said magnetic means and having a coil on opposite sides of said magnetic axis, whereby each coil senses any movement of said magnetic field and generates an electrical signal representative of said movement;
   (c) means for connecting said coils in electrical opposition so that the electrical signals generated in each coil in response to movement of said magnetic means in any direction other than from translational movement at right angles to the magnetic axis of said magnetic means and in said plane are canceled; and
   (d) circuit means connected to said coils for analyzing the resulting signal to determine the frequency and magnitude of translational movement of said member in said plane.

References Cited by the Examiner

UNITED STATES PATENTS

| | | | |
|---|---|---|---|
| 2,365,218 | 12/1944 | Rogers | 73—71.4 |
| 2,521,141 | 9/1950 | Allen | 73—466 X |
| 3,030,796 | 4/1962 | MacMillan | 73—71.4 X |

OTHER REFERENCES

Massa, F.: "A New Method of Vibration Measurement for the Frequency Range 20 to 20,000 c.p.s.," Instruments, vol. 21, November 1948, pp. 1012–1014.

Hajian, G.: "Design Considerations for a Vibration Meter," MB Vibration Notebook, published periodically by MB Electronics, New Haven, Conn., October 1960, vol. 6, No. 5 issue, pp. 5–7.

RICHARD C. QUEISSER, *Primary Examiner.*

JOHN P. BEAUCHAMP, *Assistant Examiner.*